J. P. Frantz,
Bee Hive.
No. 87,003.  Patented Feb. 16, 1869.
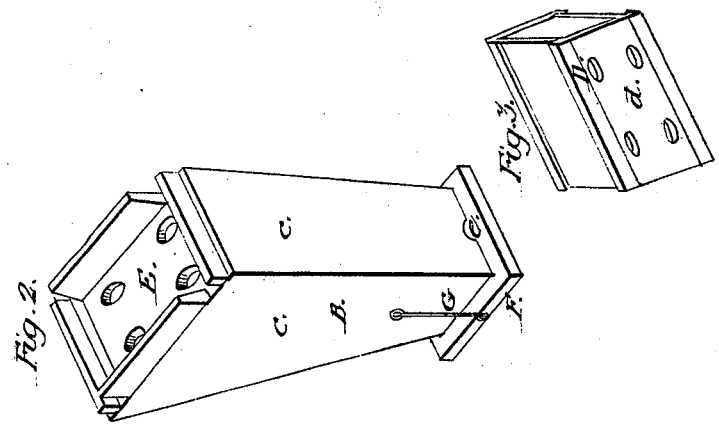
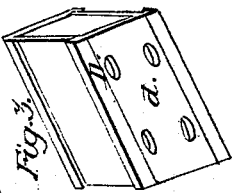
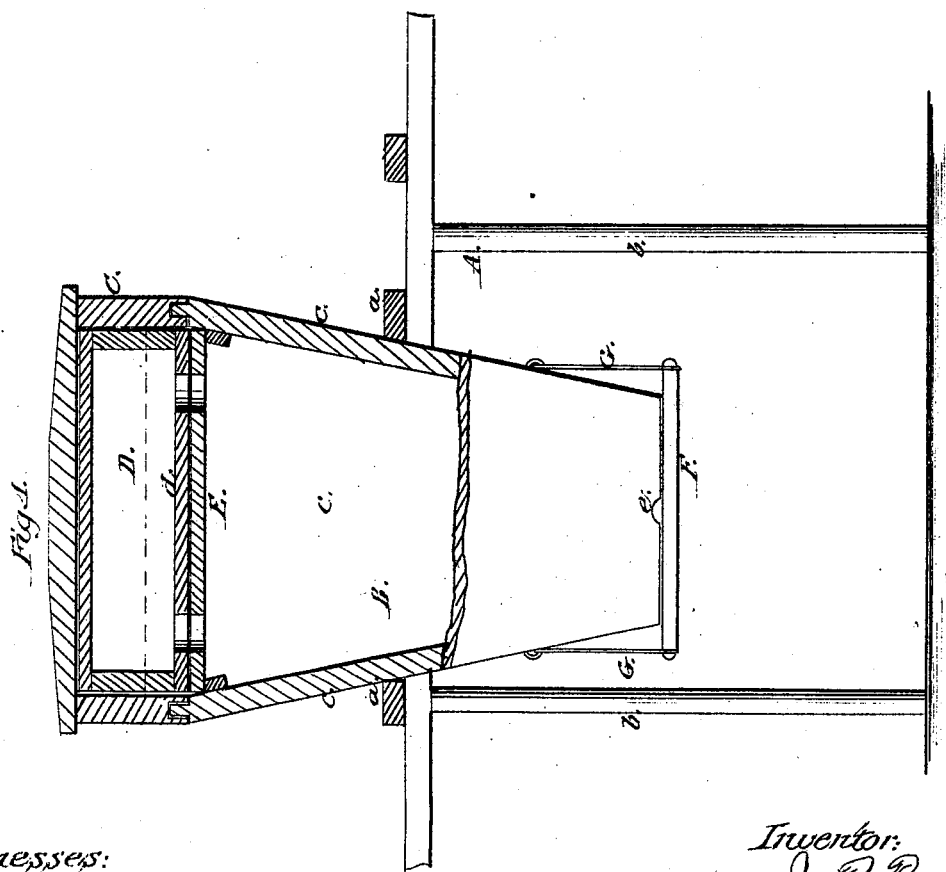
Witnesses:
Wm A. Morgan
G. C. Cotton
Inventor:
J. P. Frantz
by
Munn & Co.
att'ys

JAMES P. PRAUL, OF PLEASANT HILL, ILLINOIS.

Letters Patent No. 87,003, dated February 16, 1869.

IMPROVEMENT IN BEE-HIVES.

The Schedule referred to in these Letters Patent and making part of the same.

*To all whom it may concern:*

Be it known that I, JAMES P. PRAUL, of Pleasant Hill, in the county of Pike, and State of Illinois, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 is a vertical central section of my invention.

Figure 2 is a diminished perspective view of the body or main portion of the same.

Figure 3 is a detached perspective view of a honey-box pertaining to the same.

Similar letters of reference indicate like parts.

This invention relates to a new and improved bee-hive; and

It consists in a novel construction of the same, whereby the comb is sustained within the hive, or prevented from falling, and the bees thoroughly protected against the ravages of the moth.

In the accompanying sheet of drawings—

A represents a framing, which may be constructed in any proper manner to support the hive B.

The frame I have adopted, consists of four strips, $a$, nailed or otherwise secured together, to form a square, and supported at a suitable height by an upright, $b$, at each corner or angle.

The body or main portion, B, of the hive is made of quadrilateral form, its sides $c$ being inclined so that B will gradually increase in width from the bottom upward, as shown clearly in figs. 1 and 2. This form of the body of the hive admits of its being suspended within the framing A, as shown in fig. 1.

On the top of the body B there is placed a cap, C, of quadrilateral form, said cap being arranged in such a manner that it may be readily fitted on and removed from B.

This cap covers the spare-honey box D, which has its bottom, $d$, so arranged that it may be removed or drawn out, when necessary, in order to take the honey from D.

E is the honey-board on which the spare-honey box rests. This honey-board is also arranged so that it may be removed, when necessary, in order that honey may be taken from B, or old combs removed, when required.

F is the bottom board of the hive, which is suspended from B by means of hooks G.

During the winter-season, or cold weather, the bottom board is suspended in close contact with the bottom of B, a notch, $e$, being made in the lower edge of one of the sides $c$, to serve as a bee-entrance.

During the summer-season, or warm weather, the bottom board may be suspended rather lower, to admit air for thorough ventilation.

By having the body B of the hive gradually contract in width from its upper to its lower end, the combs are prevented from dropping out, and a free escape allowed for all filth and droppings from the hive.

The bees also are enabled to eject the moth with the greatest facility from the narrow space at the lower part of the hive, and during winter, the bees are allowed to congregate more compactly together than in the ordinary square or rectangular hives, and consequently will not be so much affected by extreme cold weather.

I am aware that the devices herein described, in themselves considered, are not new, and I do not therefore claim them.

Having thus described my invention,

I claim as new, and desire to secure by Letters Patent—

The combination of the framing A, hive B, with its cap, C, and suspended bottom board F, all arranged substantially as and for the purpose set forth.

The above specification of my invention signed by me, this    day of    , 1868.

JAMES P. PRAUL.

Witnesses:
  A. J. LOWELL,
  BARNET JEWEL.